Feb. 18, 1930.  F. H. BURNS  1,747,660
UTENSIL HANDLE
Filed Sept. 11, 1928
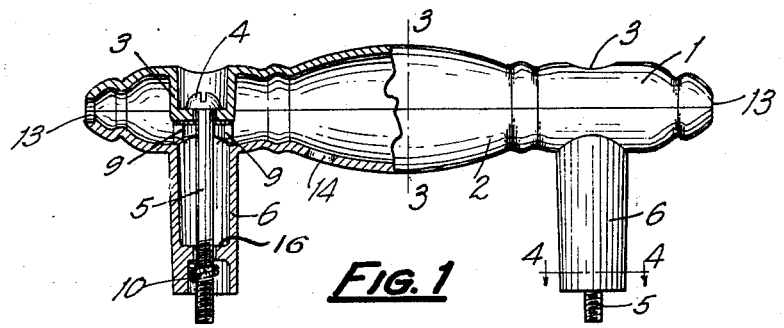
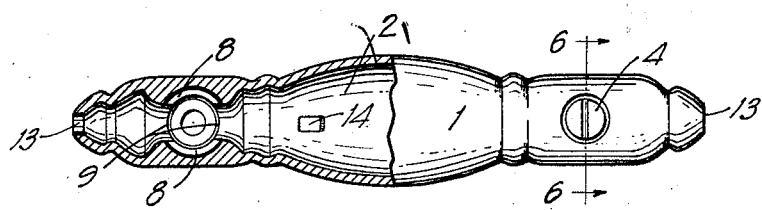
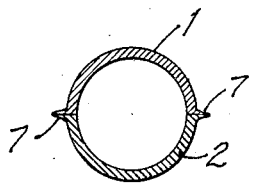
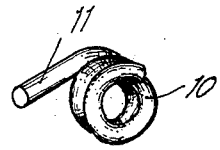
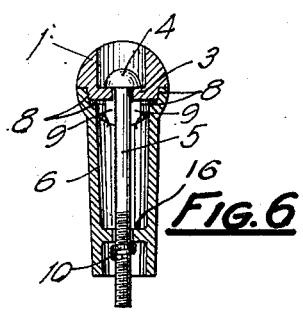
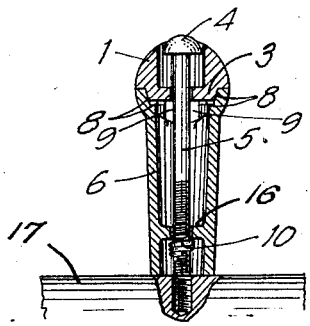
INVENTOR
Frank H. Burns
By 
ATTORNEY Patented Feb. 18, 1930

1,747,660

UNITED STATES PATENT OFFICE

FRANK H. BURNS, OF HOOSICK FALLS, NEW YORK

UTENSIL HANDLE

Application filed September 11, 1928. Serial No. 305,279.

My invention relates to handles for cooking utensils and the like, and especially those which are subjected to moderate heat. It relates particularly to structural improvements in molded handles whereby the assembling and finishing thereof are greatly facilitated and their appearance and heat-radiating qualities are enhanced.

The general objects of my invention are to provide a handle of simple, inexpensive character which will be highly resistant to heat and of strong, durable construction; which may be easily manufactured; and which will be adapted to receive a high grade finish. In addition to the foregoing objects, it is the purpose of my invention to provide a utensil handle of the molded type comprising separable parts or elements which may be easily assembled and secured together in positively aligned relation for finishing and shaping, and which may be attached to the utensil, as a unit, without the necessity of disassembling. A still further object is to provide a utensil handle of such character that a minimum amount of heat will pass to the handle by conduction from the utensil, and which will be provided with air circulating passages throughout the interior thereof whereby such heat as may be absorbed by the handle will be removed by the circulation of air therethrough.

With these objects in view my invention includes the novel elements and the arrangements and combinations thereof described below and illustrated in the accompanying drawings, in which—

Fig. 1 is a side view of my handle, partially in outside elevation and partially in section;

Fig. 2 is a top view of Fig. 1, partially in outside elevation and partially in section;

Fig. 3 is a section of Fig. 1 approximately in the plane 3—3 and illustrates the projections which appear on the sides of the handle elements when they come from the dies or molds and which must be removed in the finishing process;

Fig. 4 is a section of Fig. 1 in the plane 4—4;

Fig. 5 is a perspective view of a preferred form of nut for securing the separate parts of the handle together;

Fig. 6 is a section of Fig. 2 in the plane 6—6; and

Fig. 7 is a section similar to Fig. 6 illustrating a fragmentary portion of the utensil to which the handle is attached and showing how the separate parts of the handle remain secured together when the attaching screws are partially backed out.

Referring to the drawings, my handle in its preferred embodiment comprises separable elements or portions, 1 and 2. Each element forms substantially a half portion of the handle. These half sections are preferably molded from bakelite or some other phenol or the like compound which is infusible, insoluble and capable of receiving a high polish. The portion, 1, comprises a shell-like element, provided upon its interior with hollow or recessed bosses, 3, adapted to receive the head, 4, of screws, 5. The portion, 2, is also a shell-like element conforming in contour to element, 1, and provided with the spaced legs or projections, 6, which serve to offset the handle from the utensil to which it is attached. These legs, 6, are hollow and are so spaced as to receive the screws, 5, passing through the bosses, 3, in part, 1.

In forming elements, 1 and 2, by means of dies, thin fins, 7, of surplus material which is extruded from the die, are formed on the edges of these parts. These fins must, of course, be removed, and the entire handle polished and buffed. In order to produce a perfect handle in which the line of separation between the half sections will not be objectionably apparent, it is important that the fin-removing, finishing and polishing operations be conducted with the parts of the handle in definitely assembled relation. It is also quite important in manufacturing handles in quantity that the two half-handles which are finished together be kept together and in the same relative position in which they were finished and polished. It is also important that the handle be so designed that it may be attached to the utensil without the necessity of separating the elements, 1 and 2.

For this reason, the portion, 2, is provided with segmental recesses, 8, which are adapted to receive the bosses, 3. The exterior of the bosses, 3, may be slightly tapered and the interior of the recesses may be given a complementary taper so that a very close wedging fit is obtained, thus preventing any relative movement whatsoever of the portions, 1 and 2, when once assembled in the position shown in the drawings. The recesses, 8, are made segmental instead of completely cylindrical to provide air passages, 9, between the portions of the handle on either side of the recesses, and between the hollow legs, 6, and the handle proper.

After the half-handle portions have been molded they are assembled as shown in the drawings. The screws, 5, are inserted and the nuts, 10, preferably consisting of a few turns of wire, are threaded onto the screws and the screws are tightened until the nuts, 10, are brought against the diaphragms, 16, in the legs, 6. One end, 11, of the wire nut extends outwardly, as shown in Fig. 5, and the interior of the legs, 6, between the bottom and the diaphragms, 16, are flattened, as shown at 12, (see Fig. 4) so that once the nut is inside of the leg it cannot turn with the screw.

After the handle has been finished and polished it is retained in assembled position until attached to the utensil. In attaching to the utensil, it is only necessary to back out the screws, 5, as shown in Fig. 7, place the handle in position upon the utensil, 17, and thereafter tighten the screws.

In order to provide for a circulation of air throughout the interior of the handle, openings, 13, may be provided in the ends of the handle, and other openings, 14, for example, at other points. It will be noted that very little heat will be transmitted from the utensil through the screws, 5, to the handle because of the air space about substantially the entire length of the screw. Furthermore, this air space communicates with the outside atmosphere through the passages, 9, and through the openings, 13 and 14, provided in the handle. The fact that the handle is thus ventilated not only prevents heat from being transmitted from the utensil to the handle but also allows the handle to rapidly radiate such heat as it might absorb by being placed directly over a fire. By providing complementary interfitting portions on the separable parts of the handle and by so designing the parts that it is unnecessary to disassemble them once they are put together, the heretofore existing necessity of "matching up" separate elements has been eliminated. The handles are shipped as assembled units and remain "matched" as finished and polished.

While I have described my invention in its preferred embodiment it is to be understood that the drawings are merely illustrative, that the words which I have used are words of description rather than of limitation, and that changes, within the purview of the appended claims, may be made without departing from the true scope and spirit of my invention in its broader aspects.

What I claim is—

1. In a utensil handle, the combination with a plurality of separate elements assembled to form said handle, of means positively aligning said elements in assembled relation, and means for securing said elements in aligned, assembled relation; said last mentioned means being adapted for securing said handle to the utensil while maintaining the elements in assembled relation.

2. In a utensil handle comprising separate elements assembled to form said handle, the combination with means positively aligning said elements in assembled relation, of means integral with one of said elements and adapted to offset said handle from the utensil, and means coacting with the offsetting means for securing said elements in assembled relation.

3. A utensil handle comprising separate, shell-like elements each forming substantially half of the handle, and one of said elements being provided with projections upon the interior thereof coacting with recesses provided in the other element to positively align said elements in assembled relation.

4. A utensil handle comprising separate, shell-like elements each forming substantially half of the handle; one of said elements being provided with projections upon the interior thereof coacting with recesses provided in the other element to positively align said elements in assembled relation; and screws, adapted to secure said handle to a utensil, passing through said projections and coacting with said elements to hold them in assembled relation.

5. A utensil handle comprising separate, shell-like elements each forming substantially half the handle, hollow legs integral with one element and adapted to offset said handle from the utensil, complementary interfitting portions on said elements adapted to maintain them in aligned position, and bolts extending through said elements and said legs for holding the elements in assembled relation.

6. A utensil handle of the molded type comprising separable, shell-like elements having inwardly disposed, interfitting projections adapted to positively align said elements in assembled relation.

7. A utensil handle of the molded type comprising separable, shell-like elements having inwardly disposed, hollow projections adapted to interfit and thereby positively align said elements in assembled relation to form a hollow unit.

FRANK H. BURNS.